(12) United States Patent
Chiu et al.

(10) Patent No.: US 11,654,644 B2
(45) Date of Patent: May 23, 2023

(54) METHOD FOR INJECTION MOLDING PLUS POWER LENS ELEMENTS

(71) Applicant: Essilor International, Charenton-le-Pont (FR)

(72) Inventors: Hao-Wen Chiu, Dallas, TX (US); David Bracero, Dallas, TX (US); Shawn McDermott, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 890 days.

(21) Appl. No.: 16/480,551

(22) PCT Filed: Jan. 26, 2018

(86) PCT No.: PCT/EP2018/052001
§ 371 (c)(1),
(2) Date: Jul. 24, 2019

(87) PCT Pub. No.: WO2018/138287
PCT Pub. Date: Aug. 2, 2018

(65) Prior Publication Data
US 2019/0389160 A1 Dec. 26, 2019

(30) Foreign Application Priority Data
Jan. 27, 2017 (EP) .................................... 17153631

(51) Int. Cl.
*B29D 11/00* (2006.01)
*G02B 5/00* (2006.01)
(Continued)

(52) U.S. Cl.
CPC .... *B29D 11/0048* (2013.01); *B29D 11/00692* (2013.01); *G02B 5/003* (2013.01); *B29K 2069/00* (2013.01); *B29K 2105/0005* (2013.01)

(58) Field of Classification Search
CPC .......... B29D 11/0048; B29D 11/00692; G02B 5/003
See application file for complete search history.

(56) References Cited

U.S. PATENT DOCUMENTS

| 5,800,744 A | 9/1998 | Munakata |
| 5,948,327 A | 9/1999 | Saito et al. |

(Continued)

FOREIGN PATENT DOCUMENTS

| CN | 1036272 A | 10/1989 |
| CN | 1213336 A | 4/1999 |

(Continued)

OTHER PUBLICATIONS

Combined Chinese Office Action and Search Report dated May 31, 2021 in Chinese Patent Application No. 201880008615.5 (with English translation), 21 pages.

(Continued)

*Primary Examiner* — Mathieu D Vargot
(74) *Attorney, Agent, or Firm* — Oblon, McClelland, Maier & Neustadt, L.L.P.

(57) ABSTRACT

A method for injection molding of a plus power lens element comprises injecting a melt of thermoplastic material comprising at least one UV absorber at a temperature higher than a glass transition temperature (Tg) of the thermoplastic material in an initial molding cavity delimited by two facing mold inserts. During the injecting, the two facing mold inserts are moved toward one another to define a final molding cavity whose volume is less than that of the initial molding cavity. After cooling and opening of the mold cavity, the plus power lens element is recovered. One of the two facing mold inserts comprises a flat surface facing the initial molding cavity, thereby to form a flat surface on one side of the plus power lens element, and the other of the two facing mold inserts comprises a concave surface facing the (Continued)

initial molding cavity, thereby to form a convex surface on an opposite side of the plus power lens element.

15 Claims, 1 Drawing Sheet

(51) Int. Cl.
*B29K 69/00* (2006.01)
*B29K 105/00* (2006.01)

(56) References Cited

U.S. PATENT DOCUMENTS

| | | | |
|---|---|---|---|
| 6,033,518 A | 3/2000 | Backfisch | |
| 6,210,610 B1 | 4/2001 | Saito et al. | |
| 6,616,868 B1 | 9/2003 | Gotoh et al. | |
| 6,767,482 B2 * | 7/2004 | Nishimoto | B29C 45/561 |
| | | | 425/808 |
| 7,457,040 B2 | 11/2008 | Amitai | |
| 7,854,865 B2 | 12/2010 | Chiu et al. | |
| 2003/0080448 A1 | 5/2003 | Nishimoto et al. | |
| 2003/0090622 A1 | 5/2003 | Takeuchi | |
| 2003/0201555 A1 | 10/2003 | Gotoh et al. | |
| 2004/0096539 A1 | 5/2004 | McCaffrey et al. | |
| 2006/0027901 A1 | 12/2006 | Chiu et al. | |
| 2007/0001327 A1 | 1/2007 | Chiu | |
| 2015/0338680 A1 * | 11/2015 | Spratt | G02C 7/024 |
| | | | 351/159.76 |
| 2017/0165931 A1 | 6/2017 | Wolterink et al. | |

FOREIGN PATENT DOCUMENTS

| | | |
|---|---|---|
| CN | 2609011 Y | 3/2004 |
| CN | 2629053 Y | 7/2004 |
| CN | 1579980 A | 2/2005 |
| CN | 101084103 A | 12/2007 |
| CN | 101109631 A | 1/2008 |
| CN | 101186101 A | 5/2008 |
| CN | 101497700 A | 8/2009 |
| CN | 102334046 A | 1/2012 |
| CN | 103026267 A | 4/2013 |
| DE | 33 46 785 A1 | 6/1984 |
| EP | 0 799 690 A2 | 10/1997 |
| EP | 0 968 807 A1 | 1/2000 |
| EP | 1 105 289 A1 | 6/2001 |
| GB | 967148 | 8/1964 |
| JP | 11-227008 A | 8/1999 |
| WO | WO 2016/003275 A1 | 1/2016 |

OTHER PUBLICATIONS

International Search Report and Written Opinion dated Apr. 9, 2018 in PCT/EP2018/052001 filed on Jan. 26, 2018.
Combined Chinese Office Action and Search Report dated Nov. 9, 2020 in Patent Application No. 201880008615.5 (with English language translation), 21 pages.

* cited by examiner

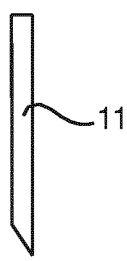
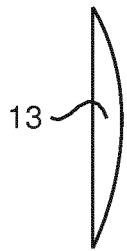
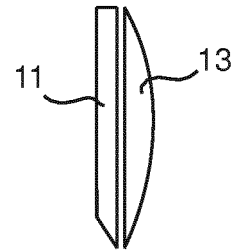
Fig. 1a    Fig. 1b    Fig. 1c
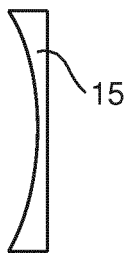
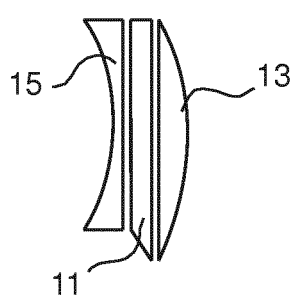
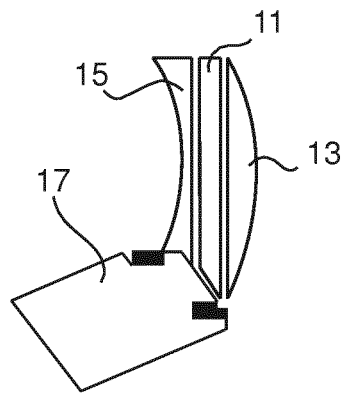
Fig. 1d    Fig. 1e    Fig. 1f
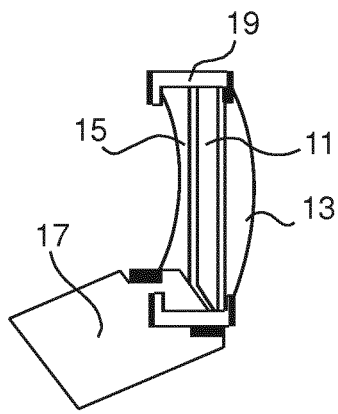
Fig. 2

METHOD FOR INJECTION MOLDING PLUS POWER LENS ELEMENTS

BACKGROUND OF THE INVENTION

1. Field of the Invention

The invention relates generally to a method for injection molding plus power lens elements.

2. Description of Related Art

Prescription augmented reality eyewear may comprise lens assemblies in which a light-guide optical element (LOE) as described for example in U.S. Pat. No. 7,457,040 is sandwiched between a front plano-concave (plus) lens, and a rear plano-convex (minus) lens, wherein the front and rear lenses correct the vision of the wearer.

The front and rear lenses of such an assembly, however, are much thinner than conventional one-piece lens wafers, which poses significant challenges as regards their manufacture. It would be highly desirable to produce the wafers from which such plus and minus lenses are cut by an injection molding process, as is done for lens wafers for conventional eyeglass lenses; however, the plus and minus lenses used in the three-part lens assembly for augmented reality eyewear, have dimensions such that they are not well suited to being made using conventional injection molding techniques, such as those described in commonly-owned U.S. Pat. No. 7,854,865.

SUMMARY OF THE INVENTION

Thus, in one aspect, the present invention relates to a method for injection molding of a plus power lens element, comprising injecting a melt of thermoplastic material comprising at least one UV absorber at a temperature higher than a glass transition temperature (Tg) of the thermoplastic material in an initial molding cavity delimited by two facing mold inserts. During the injecting, the two facing mold inserts are moved toward one another to define a final molding cavity whose volume is less than that of the initial molding cavity. After cooling and opening of the molding cavity, the plus power lens element is recovered. One of the two facing mold inserts comprises a flat surface facing the initial molding cavity, thereby to form a flat surface on one side of the plus power lens element, and the other of the two facing mold inserts comprises a concave surface facing the initial molding cavity, thereby to form a convex surface on an opposite side of the plus power lens element. The invention is characterized the moving step of the two facing mold inserts toward one another is effected at a speed of greater than 100 mm/s.

In exemplary embodiments of the method according to the present invention, the injecting is performed at a speed of greater than about 50 mm/s.

In exemplary embodiments of the method according to the present invention, the injecting is performed at a speed of 60-120 mm/s.

In exemplary embodiments of the method according to the present invention, an edge distance between the two facing mold inserts when delimiting the initial molding cavity is not more than 2.5 times an edge thickness of the plus power lens element.

In exemplary embodiments of the method according to the present invention, an edge distance between the two facing mold inserts when delimiting the initial molding cavity is 1 to 2 times an edge thickness of the plus power lens element.

In exemplary embodiments of the method according to the present invention, the moving of the two facing mold inserts toward one another is effected at a speed of 150-250 mm/s.

In exemplary embodiments of the method according to the present invention, the thermoplastic material includes one or more of polycarbonates, polyacrylics, polyols, polyamines, polyamides, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and cellulose triacetate.

In exemplary embodiments of the method according to the present invention, the thermoplastic material is a polycarbonate resin.

In exemplary embodiments of the method according to the present invention, the polycarbonate resin has a melt flow rate at 300° C./1.2 kg that is at least 15 cm$^3$/10 min.

In exemplary embodiments of the method according to the present invention, the polycarbonate resin has a melt flow rate at 300° C./1.2 kg that is at least 20 cm$^3$/10 min.

In exemplary embodiments of the method according to the present invention, the polycarbonate resin has a weight average molecular weight of less than 26,000 g/mol.

In exemplary embodiments of the method according to the present invention, the at least one UV absorber is a benzotriazole absorber.

In exemplary embodiments of the method according to the present invention, the at least one UV absorber is 2,2'-methylenebis(6-(2H-benzotriazol-2-yl)-4-1,1,3,3-tetramethylbutyl)phenol).

In exemplary embodiments of the method according to the present invention, the at least one UV absorber is 2-(5-chloro-2H-benzotriazol-2-yl)-6-(1,1-dimethylethyl)-4-methyl phenol.

In exemplary embodiments of the method according to the present invention, the flat surface of the one of the two facing mold inserts has less than 20 fringes as indicated by flatness measurements using interference fringes of monochromatic light.

In exemplary embodiments of the method according to the present invention, the flat surface of the one of the two facing mold inserts has less than 10 fringes as indicated by flatness measurements using interference fringes of monochromatic light.

In exemplary embodiments of the method according to the present invention, the plus power lens element has an edge thickness of at most 1.0 mm and a center thickness of at least 1.1 mm.

In exemplary embodiments of the method according to the present invention, the flat side of the plus power lens element is bonded to one side of a light-guide optical element.

In exemplary embodiments of the method according to the present invention, a minus power lens element is bonded to an opposite side of the light-guide optical element.

In another aspect, the present invention relates to a plus power lens element, comprising a wafer of thermoplastic material comprising at least one UV absorber. The wafer has a first major surface that is flat and a second major surface that is convex. The wafer has a diameter in a range from 55-85 mm, an edge thickness of at most 1.0 mm and a center thickness of at least 1.1 mm.

BRIEF DESCRIPTION OF THE DRAWINGS

Other objects, features and advantages of the invention will become more apparent after reading the following detailed description of exemplary embodiments of the invention, given with reference to the accompanying drawings, in which:

FIG. 1a is a schematic side view of a light-guide optical element suitable for use in a prescription augmented reality eyewear lens assembly;

FIG. 1b is a schematic side view of a plano-concave lens suitable for use in a prescription augmented reality eyewear lens assembly, and produced according to the method of the present invention;

FIG. 1c is a schematic side view of a light-guide optical element to which a plano-concave lens produced according to the method of the present invention has been bonded;

FIG. 1d is a schematic side view of a plano-convex lens suitable for use in a prescription augmented reality eyewear lens assembly;

FIG. 1e is a schematic side view of the subassembly of FIG. 1c, to which a plano-convex lens has been bonded;

FIG. 1f is a schematic side view of the subassembly of FIG. 1e, to which a micro-display projector has been bonded; and FIG. 2 is a schematic side view in which the assembly of FIG. 1f has been mounted into eyeglass frames.

DETAILED DESCRIPTION OF EXEMPLARY EMBODIMENTS

Referring now to FIG. 1a, a light-guide optical element (LOE) 11 may be produced as described for example in U.S. Pat. No. 7,457,040. In order to provide prescription augmented reality eyewear, a front plano-concave (plus) lens 13 as shown in FIG. 1b is bonded to the LOE 11, as shown in FIG. 1c. A rear plano-convex (minus) lens 15 as shown in FIG. 1d is then bonded to the rear side of LOE 11, as shown in FIG. 1e. Next, a micro-display projector 17 is bonded to the edge of LOE 11, as shown in FIG. 1f, and that lens assembly is then mounted into a pair of eyeglass frames 19, as shown in FIG. 2.

The wafers from which the plus lenses 13 are made include a flat side and a curved side, and preferably meet very stringent geometrical, optical, and performance requirements as shown below. In particular, such lenses should have an edge thickness (ET) that is at most 0.5 mm, and a center thickness (CT) that is at least 1.3 mm. They should also permit obtaining a lens assembly having a power profile (sphere, cylinder, prism) in which sphere and cylinder are within the range of ±0.06 diopter (D), and prism is within ±(0.25+0.1*power)/2. Power homogeneity as determined by Dual LensMapper (DLM, manufactured by Automation & Robotics SA) measurement of a 16×16 mm² square area at lens center is preferably to have both sphere and cylinder peak-to-valley (PtV) values of less than 0.15 D. Warpage of the flat surface of the plus lens 13 as determined by an Automation & Robotics SA Focovision SR-2 is preferably such that sphere and cylinder are within ±0.06 D (whereas in a typical lens product a warpage up to 0.50 D is allowed). Furthermore, warpage evolution of the flat surface after coating, as measured by SR-2 is preferably such that changes of sphere and cylinder are within ±0.03 D. The assembly should furthermore pass FDA/CEN, thermal shock, compression test, and UV aging tests.

Such requirements present great challenges for injection molding. Injection molding of a plus wafer (or lens) is done by filling the molding cavity from one side to the other. However, for a plus wafer, the center thickness is relatively thick while the edge thickness is much thinner. The very thin edge presents very high resistance to flow, such that the edge region may freeze off before the molding cavity is completely filled.

A further difficulty arises in that the high flow resistance at the periphery of a plus wafer requires very high injection pressure to fill the cavity, which can result in high residual stresses in molded parts that would eventually lead to high warpage before and after coating.

The foregoing difficulties have been impediments to the use of existing polycarbonate lens injection process configurations, including machines and high viscosity ophthalmic grade PC resins, in producing wafers that meet LOE assembling requirements.

The method according to the present invention provides an injection-molding technique for making plus power wafers, preferably from polycarbonate, that meet the above mentioned performance criteria, especially as regards thickness and warpage.

In particular, it has been found that combining an injection-coining process with a high flow thermoplastic resin, preferably polycarbonate, instead of regular ophthalmic grades would reduce the flow resistance and thus the residual stresses. A high-speed injection-coining process is especially effective to prevent premature freezing-off of the peripheral wafer region, and to promote complete filling of the molding cavity. A process for injection molding plus wafers, preferably from polycarbonate, using a high-speed injection-coining process with specific process parameters and a high flow preferably polycarbonate resin of a specific viscosity range, is described herein.

EXAMPLES

In general, a mold cavity for injection molding of plus wafers is formed by two opposite faced inserts, one flat and the other concave. An injection-coining process is typically characterized by forming a cavity having an opening that is larger than target part thickness at the beginning of an injection cycle. This enlarged cavity thickness would significantly reduce the flow resistance and thus the pressure requirement of filling the cavity. Subsequently, the cavity opening would close down quickly through movement of inserts and/or mold plates to the final part thickness before the end of injection. The injection speed, initial opening of the cavity, and the closing speed according to the invention, however, need to be carefully determined in order to fill the cavity completely and to have an even distribution of cavity pressure to minimize wafer warpage. It was found that the injection speed is preferably greater than about 50 mm/s and the moving step of the two facing mold inserts toward one another is advantageously perform at a speed of greater than 100 mm/s. The edge distance of the initial cavity opening should be no more than 2.5 times the target wafer edge thickness of the plus wafers, and preferably between 1 to 2 times.

It was also found, however, that the use of a high-speed injection-coining process alone is generally not sufficient to produce plus wafers meeting the optical requirements when using high viscosity ophthalmic grade polycarbonate (PC) resins such as Sabic Lexan RL7220. A high flow PC resin having a weight average molecular weight of less than 26,000 and a melt flow rate at 300° C./1.2 kg of at least 15 cm$^3$/10 min and preferably at least 20 cm$^3$/10 min per ISO1133 or a viscosity of less than 400 Pa for shear rates below 1000 s$^{-1}$ at 300° C. facilitates overcoming high flow resistance, reducing residual stresses, and minimizing warpage.

Utilizing the foregoing criteria a combination of a high-speed injection-coining process with carefully selected process parameters, flat inserts having specific flatness, and a high flow PC resin containing a UVA and within a specific viscosity range has been utilized to injection mold plus LOE PC wafers that meet very strict geometrical, optical, and performance requirements.

In the table below, injection molding results of plus LOE PC wafers produced according to the present invention, shown in the right-hand column, are compared to wafers produced conventionally, shown in the left-hand column:

| | Example - Injection molding of +1.00/0.00 LOE PC wafers | |
|---|---|---|
| PC resin<br>MFR (300° C./1.2 kg) | Sabic Lexan RL7220<br>ophthalmic<br>MFR ~7 (cm$^3$/10 min) | Sabic Lexan OQ1028<br>high flow<br>MFR > 50 (cm$^3$/10 min) |
| | Experimental setup | |
| Injection molding machine | Nissei ES4000 | Arburg All-Rounder 420 |
| Mold | 2-cavity | single-cavity |
| Diameter (mm) | 70 | 73 with 70 usable |
| Flat insert type and flatness | Stainless Steel (SS) - 5-fringe flatness | SS - 5-fringe flatness |
| CV insert type and radius | SS - $R_{CV}$ 586 mm | SS - $R_{CV}$ 586 mm |
| | Injection molding process parameters | |
| PC resin drying | 250° F. for 4 hours in a desiccant dryer | 250° F. for 4 hours in a desiccant dryer |
| Mold temperature (° F.) | 250 | 210 |
| Melt temperature (° F.) | 590 | 590 |
| Shot size (cm$^3$) | 70 | 35 |
| Injection speed (mm/s) | 100 | 90 |
| Injection-coining | No | Yes |
| Initial gap (mm) | N/A | 0.75 |
| Velocity (mm/s) | N/A | 200 |
| | Resulting plus wafers | |
| Center thickness (mm) | 2.0 (lowest achievable) | 1.4 |
| Edge Thickness (mm) | 0.95 (lowest achievable) | 0.33 |
| SR-2 @ wafer flat side center | | |
| Sphere (mean) | 0.03 | 0.01 |
| Sphere (stdev) | 0.05 | 0.01 |
| Cylinder (mean) | 0.06 | −0.01 |
| Cylinder (stdev) | 0.04 | 0.02 |
| Through power | 0.98 | 0.97 |

Furthermore, very flat inserts having less than 20 fringes, and preferably less than 10 fringes, as indicated by flatness measurements using interference fringe of monochromatic should be used in order to guarantee the flat side of a wafer meets flatness requirements for LOE assembling process.

Lastly, as most commercial high flow optical grade PC resins are for indoor applications such as producing CD/DVD or Blue-ray discs, they typically do not contain UV absorbers (UVA) that are needed for preventing UV aging of the LOE assembly and providing UV protection to wearers' eyes. An in-house formulation consisting of 0.1 wt % of BASF Tinuvin 360 benzotriazole UV absorber blended with high flow PC resin was developed. The formulation was shown to achieve 380 nm UV cut-off that effectively prevented resulting wafers from UV aging as indicated by a zero increase in yellowness index after 80 hours of QSun test.

The wafer thus produced will include a gate mark as an artifact of the injection molding process.

As the above data shows, +1.00 wafers meeting optical and geometrical requirements were successfully molded using the present method. Moreover, birefringence showed the residual stresses of the wafers made according to the present invention to be very low as compared to the wafers made conventionally. On the other hand, using regular ophthalmic grade PC with a straight injection process resulted in wafers of poor optics. The lowest achievable center thickness was 2.0 mm and the edge thickness was 0.95 mm, which is significantly higher than the desired 0.5 mm maximum edge thickness.

It will be appreciated that the present method permits using existing injection molding machines and concave inserts, so that there is no need to acquire new machines, while plus wafers meeting all performance requirements can be produced.

While the present invention has been described in connection with various exemplary embodiments thereof, it is to be understood that those embodiments are provided merely to illustrate the invention, and should not be used as a pretext to limit the scope of protection conferred by the true scope and spirit of the appended claims.

The invention claimed is:

1. A method for injection molding of a plus power lens element, comprising:
    injecting a melt of thermoplastic material comprising at least one UV absorber at a temperature higher than a glass transition temperature (Tg) of said thermoplastic material in an initial molding cavity delimited by two facing mold inserts;
    during said injecting, moving said two facing mold inserts toward one another to define a final molding cavity whose volume is less than that of said initial molding cavity; and
    after cooling and opening of the molding cavity, recovering said plus power lens element,
    wherein one of said two facing mold inserts comprises a flat surface facing said initial molding cavity, thereby to form a flat surface on one side of said plus power lens element,
    wherein the other of said two facing mold inserts comprises a concave surface facing the initial molding cavity, thereby to form a convex surface on an opposite side of the plus power lens element,
    wherein an edge distance between said two facing mold inserts when delimiting said initial molding cavity is not more than 2.5 times an edge thickness of the plus power lens element,
    wherein said moving of the two facing mold inserts toward one another is effected at a speed of greater than 100 mm/s, and
    wherein said injecting is performed at a speed of greater than about 50 mm/s.

2. The method according to claim 1, wherein said injecting is performed at a speed of 60-120 mm/s.

3. The method according claim 1, wherein the edge thickness of said plus power element is of at most 1.0 mm.

4. The method according to claim 3, wherein an edge distance between said two facing mold inserts when delimiting said initial molding cavity is 1 to 2 times an edge thickness of the plus power lens element.

5. The method according to claim 1, wherein said moving of the two facing mold inserts toward one another is effected at a speed of 150-250 mm/s.

6. The method according to claim 1, wherein said thermoplastic material is a polycarbonate resin.

7. The method according to claim 6, wherein said polycarbonate resin has a weight average molecular weight of less than 26 000 g/mol.

8. The method according to claim 6, wherein the polycarbonate resin is injected at a speed of greater than about 50 mm/s and has a melt flow rate at 300° C./1.2 kg of at least 15 cm$^3$/10 min per ISO1133 or a viscosity of less than 400 Pa for shear rates below 1000 s$^{-1}$ at 300° C.

9. The method according to claim 1, wherein the at least one UV absorber is a benzotriazole absorber.

10. The method according to claim 1, wherein the at least one UV absorber is 2,2'-methylenebis(6-(2H-benzotriazol-2-yl)-4-1,1,3,3-tetramethylbutyl)phenol).

11. The method according to claim 1, wherein the at least one UV absorber is 2-(5-chloro-2H-benzotriazol-2-yl)-6-(1,1-dimethylethyl)-4-methyl phenol.

12. The method according to claim 1, wherein the flat surface of said one of the two facing mold inserts has less than 20 fringes as indicated by flatness measurements using interference fringes of monochromatic light.

13. The method according to claim 1, further comprising bonding the flat side of the plus power lens element to one side of a light-guide optical element.

14. The method according claim 3, wherein the edge thickness of said plus power element is of at most 0.5 mm.

15. The method according to claim 8, wherein the polycarbonate resin has a melt flow rate at 300° C./1.2 kg of at least 20 cm3/10 min per ISO1133.

* * * * *